United States Patent
Stein et al.

(10) Patent No.: US 12,524,345 B2
(45) Date of Patent: Jan. 13, 2026

(54) SYSTEMS AND METHODS OF PRECONFIGURING COHERENCY PROTOCOL FOR COMPUTING SYSTEMS

(71) Applicant: Mercedes-Benz Group AG, Stuttgart (DE)

(72) Inventors: Skylar Stein, Sunnyvale, CA (US); Manuel Schoch, Sunnyvale, CA (US)

(73) Assignee: Mercedes-Benz Group AG, Stuttgart (DE)

(*) Notice: Subject to any disclaimer, the term of this patent is extended or adjusted under 35 U.S.C. 154(b) by 0 days.

(21) Appl. No.: 18/423,070

(22) Filed: Jan. 25, 2024

(65) Prior Publication Data

US 2025/0245155 A1 Jul. 31, 2025

(51) Int. Cl.
*G06F 12/08* (2016.01)
*G06F 12/0815* (2016.01)
*G06F 12/084* (2016.01)

(52) U.S. Cl.
CPC ........ *G06F 12/0815* (2013.01); *G06F 12/084* (2013.01)

(58) Field of Classification Search
CPC ...... G06F 12/0815; G06F 12/084; G06F 8/41; G06F 9/4881; G06F 9/5016; G06F 9/5027; G06F 9/5044; G06F 9/544; G06F 12/0811; G06F 12/0888; G06F 2212/1016; G06F 2212/17; G06F 2212/173; G06F 12/0842; G06F 12/0837
USPC ...................................................... 711/141
See application file for complete search history.

(56) References Cited

U.S. PATENT DOCUMENTS

| | | | |
|---|---|---|---|
| 10,992,257 | B2 | 4/2021 | Narla |
| 11,373,088 | B2* | 6/2022 | Bleiweiss ............ G06N 20/00 |
| 11,386,013 | B2 | 7/2022 | Shetty |
| 11,388,054 | B2 | 7/2022 | Bernat |
| 11,410,266 | B2 | 8/2022 | Matam |
| 11,565,606 | B2 | 1/2023 | Kazuno |
| 11,573,856 | B1 | 2/2023 | Ditty |
| 2011/0047335 | A1 | 2/2011 | Kumura |
| 2018/0365019 | A1* | 12/2018 | Rossi ................ G06F 16/9024 |
| 2019/0272239 | A1 | 9/2019 | Hagersten et al. |
| 2019/0391855 | A1 | 12/2019 | Bernat |
| 2020/0017114 | A1 | 1/2020 | Santoni et al. |

(Continued)

FOREIGN PATENT DOCUMENTS

| | | |
|---|---|---|
| CN | 110879546 A | 3/2020 |
| CN | 112149369 A | 12/2020 |

(Continued)

OTHER PUBLICATIONS

Francois Piednoel, SNUG Silicon Valley 2023 Keynote, The Standardization Imperative for Chiplets. Mar. 29-30, 2023, Santa Clara, CA. https://www.synopsys.com/community/resources/videos/snug-keynotes.html.

(Continued)

*Primary Examiner* — Hua J Song
(74) *Attorney, Agent, or Firm* — Mahamedi IP Law LLP

(57) ABSTRACT

A multi-processor computing system (e.g., a system-on-chip) can store, in a shared memory, (i) a reservation table that is accessible by the one or more workload processors, and (ii) a scheduling program. The system can further execute the scheduling program to schedule execution of a set of workloads by one or more workload processors in accordance with an optimized compute graph, an optimized data positioning graph, and a coherence protocol that is precomputed based on the optimized compute graph and the optimized data positioning graph.

16 Claims, 5 Drawing Sheets

(56) References Cited

U.S. PATENT DOCUMENTS

| | | |
|---|---|---|
| 2020/0073830 A1 | 3/2020 | Verrilli et al. |
| 2021/0149680 A1 | 5/2021 | Hughes et al. |
| 2022/0114028 A1 | 4/2022 | Peng et al. |
| 2022/0206846 A1 | 6/2022 | Windh |
| 2022/0283971 A1 | 9/2022 | Lee |
| 2022/0308877 A1 | 9/2022 | Maiyuran et al. |
| 2023/0017583 A1 | 1/2023 | Shah |
| 2023/0032305 A1 | 2/2023 | Krishnani |
| 2023/0036117 A1 | 2/2023 | Krishnani |
| 2023/0063601 A1 | 3/2023 | Upadhyay |
| 2023/0076599 A1 | 3/2023 | Hung et al. |
| 2023/0185624 A1 | 6/2023 | Yao |
| 2023/0305993 A1 | 9/2023 | Davis |
| 2023/0325315 A1 | 10/2023 | Dolbeau |

FOREIGN PATENT DOCUMENTS

| | | |
|---|---|---|
| CN | 114780227 A | 7/2022 |
| CN | 115688093 A | 2/2023 |
| GB | 2560708 | 9/2018 |
| KR | 20210015472 A | 2/2021 |
| TW | 201945941 A | 12/2019 |

OTHER PUBLICATIONS

Hoichi Cheong et al., "A Cache Coherence Scheme With Fast Selective Invalidation", Center for Supercomputing Research and Development, The 15th Annual International Symposium on Computer Architecture, Honolulu, May 30-Jun. 2, 1988; [Proceedings of the Annual International Symposium on Computer Architecture], Washington IEEE Comp. Soc. Press, US, vol. SYMP. 15, No. 1988, May 30, 1988, pp. 299-307, XP000041852.

International Search Report with Written Opinion of the International Searching Authority for the Application No. PCT/EP2025/050793 mailed Mar. 31, 2025.

Taiwanese Office Action for the Application No. 114103446 dated Nov. 20, 2025.

\* cited by examiner

SYSTEMS AND METHODS OF PRECONFIGURING COHERENCY PROTOCOL FOR COMPUTING SYSTEMS

BACKGROUND

Cache coherence for shared memory, multiprocessor systems defines the behavior of read and write operations to single cache addresses, and prevents data inconsistencies and incorrect program behavior. Cache coherence protocols or policies govern the manner in which caches coordinate their operations to maintain data consistency in the multiprocessor system.

SUMMARY

Given a description of (i) a hardware topology comprising an arrangement of computer components, and (ii) a software structure comprising a set of compute tasks that correspond to workloads, a heuristic or learning-based approach can be implemented to generate an optimal task schedule based on a set of weighted parameters. Hardware components of a system-on-chip or multiple-system-on-chip arrangement and their interconnects can include limitations on the set of parameters, such as maximum constraints for latency, bandwidth, memory, power usage, computing power, thermal cooling, security, robustness, etc. Furthermore, one or more of the weighted parameters may be identified through learning-based simulations, and can further include individual latency, compute unit, bandwidth, thermal values, etc. for individual components of the hardware topology (e.g., ML accelerators, autonomous drive chiplet, high-bandwidth memory chiplets, interconnects, etc.). For illustration, a network path for transmitting data between two or more cores in the system-on-chip can pass through data and/or execution caches (level one caches), one or more level two caches associated with each core, a shared cache (level three cache), a set of network interface units (NIUs), and/or a set of UCIe interconnects. Each of these components and/or the connections between the components may have constraints on latency, bandwidth, memory size, computing power, and the like.

In certain examples, a task allocation module can utilize a heuristic technique (e.g., a traveling salesman algorithm) using weighted parameters of the hardware topology (e.g., latency, bandwidth, memory size, computing power, etc.) to determine a most optimal distribution of the software structure for execution on the individual hardware components of the hardware topology. As provided herein, the software structure can be arranged as a set of compute tasks in a compute graph comprising various runnables (nodes in the graph) that may be interconnected based on the necessary interactions between the runnables. As an example, in the context of autonomous vehicles, a first runnable can involve the detection of external dynamic entities (e.g., pedestrians, other vehicles, bicyclists, etc.) within proximity of an autonomous vehicle. A second runnable can involve predicting the motion of each external dynamic entity. Accordingly, the second runnable receives, as input, the output of the first runnable, and therefore these runnables include a connection within the initial compute graph.

The compute graph can identify which particular hardware components execute each particular compute task of the software structure, and can be modified using a scheduling program and workload reservation table. Furthermore, in examples described herein, the task allocation module can output an optimized compute graph as well as an optimized data positioning graph, which can identify the data locations (e.g., in a specified memory, solid state drive, high-bandwidth memory, cache, mailbox, etc.) of where specific data elements are to be stored and accessed by specified hardware components. As such, the optimization of compute tasks given a hardware topology can result in an affinity schedule, in which specified compute tasks are allocated to specified processing units.

The optimized data positioning graph and optimized compute graph may then be executed by the hardware components of the hardware topology as data is received. In examples described herein, the optimized data positioning graph can maximize data locality for the hardware components in accessing the data required for executing their assigned runnables. Furthermore, the optimized compute graph can provide a most optimal solution for (i) allocating runnables to specified hardware components, and (ii) scheduling the execution of the runnables on the specified hardware components.

In certain examples, the hardware topology can comprise a system-on-chip comprising a set of chiplets each comprising one or more processing cores and a hierarchal arrangement of cache memories. In various examples, the system-on-chip can further include a central chiplet that includes a shared memory or main memory storing the reservation table accessible by the other chiplets and one or more cache memories for storing temporally sensitive data. A scheduling program may be executed on the central chiplet to schedule the execution of a set of workloads by the chiplets in accordance with the optimized compute graph and the optimized data positioning graph.

It is contemplated herein that since the compute graph and data positioning graph are known prior to runtime, one or more processing cores of the system-on-chip can precompute and preconfigure a coherence protocol using the optimized compute graph and the optimized data positioning graph. As provided herein, cache coherence problems can arise when multiple caches store copies of the same data, and modifications made by one cache must be propagated to other caches. In example hardware topologies described herein, coherence problems may arise when a processing core writes over data in a shared memory prior to a second processing core accessing the overwritten data, as dictated by a program. These modern read and write operations occur with such speed, that even with precision clocks, these unwanted overwrites may still occur, requiring the need for a coherence protocol to maintain cache coherence in the hardware topologies described herein.

In most shared memory, multiprocessing computing environments, the exact hardware topology and compute graph are either not known or not a primary concern. Instead, a computer model is executed on data using whatever hardware resources are available (e.g., at a datacenter) and the outputs are presented accordingly. In examples described herein, precise limitations of the hardware components and the arrangement or topology of the hardware components are measured and/or calibrated. Using learning-based or heuristic techniques, a known compute graph (e.g., a software structure for autonomously operating a vehicle) can be optimally configured for execution on the hardware topology. Because the exact location of data in caches, affinity information, dependency information, and precise scheduling is known, the computing system can precompute and preconfigure a coherence protocol and enforce the coherence protocol using cache flags in workload entries within the reservation table.

When the coherence protocol is preconfigured, the scheduling program can schedule the set of workloads in accordance with the optimized compute graph and the optimized data positioning graph by configuring workload entries corresponding to the set of workloads in the reservation table. As provided herein, each workload entry in the reservation table can include a workload identifier, a memory address, dependency information (if any) that needs to be satisfied prior to executing the workload, and a cache flag for implementing the precomputed coherence policy. As further provided herein, the cache flag for each workload entry in the reservation table can comprise one or more bits to indicate or direct the load and store configuration for workload data in memory, which can dictate, for example, whether the data is to be treated temporally or non-temporally.

It is further contemplated that precomputing the coherence protocol eliminates the need for coherence protocol determination or prediction at runtime, which can save processing, memory, and thermal management resources for data analysis and computation. Such a method can be advantageous particularly for confined computing environments with limited space, such as autonomous vehicles that require advanced computing to safely navigate public road networks.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
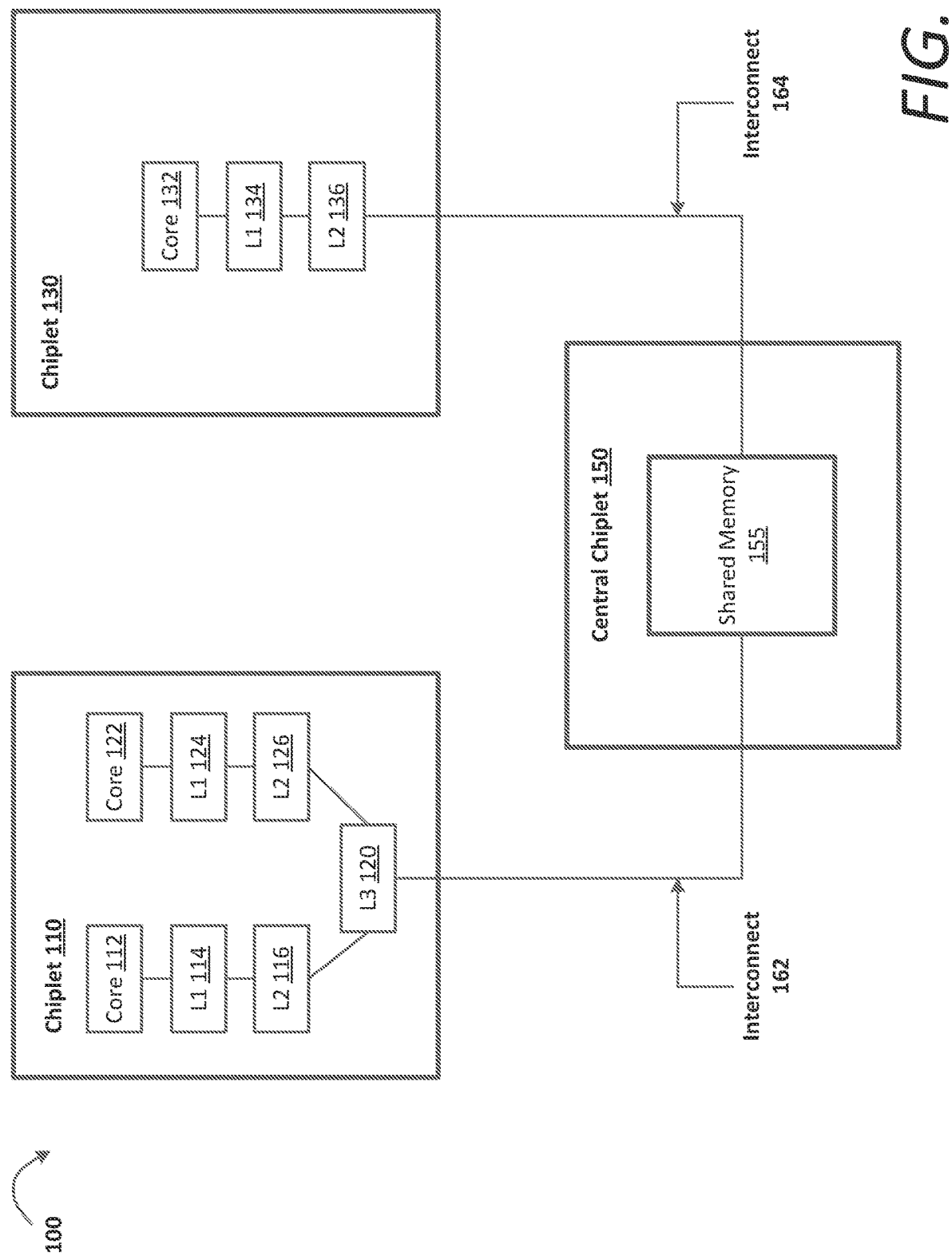
FIG. 1 is a block diagram depicting a computing system for precomputing and/or implementing a coherence protocol, in accordance with examples described herein.

Coherence defines the behavior of read and write operations to a single address location. Two common mechanisms for ensuring cache coherency are snooping and directory-based, where snooping involves individual caches monitoring address lines for accesses to memory locations that they have cached, and directory-based cache coherence involves a common directory that maintains the coherence between caches, which acts as a filter through which the processing cores must ask permission to load an entry from a primary memory to its cache. Both mechanisms are implemented at runtime, which expends computing resources that could otherwise be utilized for data analysis, computation, and other computer operations. For computer environments where space is limited, cache coherence using these traditional methods can significantly impact the optimal use of computer resources.

A system-on-chip (SoC) can comprise an integrated circuit that combines multiple components of a computer or electronic system onto a single chip, providing a compact and efficient solution for a wide range of applications. The main advantage of an SoC is its compactness and reduced complexity, since all the components are integrated onto a single chip. This reduces the need for additional circuit boards and other components, which can save space, reduce power consumption, and reduce overall cost. The components of an SoC are often referred to as chiplets, which are small, self-contained semiconductor components that can be combined with other chiplets to form the SoC.

Chiplets are designed to be highly modular and scalable, allowing for the creation of complex systems from smaller, simpler components and are typically designed to perform specific functions or tasks, such as memory, graphics processing, or input/output (I/O) functions. They may be interconnected with each other and with a main processor or controller using high-speed interfaces. Chiplets offer increased modularity, scalability, and manufacturing efficiency compared to traditional and current monolithic chip designs, as well as the ability to be tested individually before being combined into the larger system.

In accordance with examples described herein, a computer hardware topology (e.g., comprising a set of chiplets arranged on an SoC or mSoC) can be tasked with executing workloads. In certain implementations, the workloads can be executed as runnables to perform autonomous driving tasks, such as general perception, scene understanding, object detection and classification, ML inference, motion prediction and planning, and/or autonomous vehicle control tasks. In various aspects, the computing system can comprise an SoC or multiple-SoC arrangement, with each SoC comprising multiple chiplets for performing the autonomous driving tasks. Accordingly, the hardware topology can comprise the central chiplet of the SoC, one or more sensor data input chiplets, any number of workload processing chiplets, ML accelerator chiplets, general compute chiplets, autonomous drive chiplets, high-bandwidth memory chiplets, and interconnects between the chiplets.

In certain examples, the sensor data input chiplet obtains sensor data from the vehicle sensor system, which can include any combination of cameras, LIDAR sensors, radar sensors, ultrasonic sensors, proximity sensors, and the like. The central chiplet can comprise the shared memory and reservation table where information corresponding to workloads (e.g., workload entries) are inputted. In further examples, the set of workload processing chiplets can execute workloads as runnables using dynamic scheduling and the reservation table implemented in the shared memory of each SoC.

Upon obtaining each item of sensor data (e.g., individual images, point clouds, radar pulses, etc.), the sensor data input chiplet can indicate availability of the sensor data in the reservation table, store the sensor data in a cache, and indicate the address of the sensor data in the cache. Through execution of workloads in accordance with a set of independent pipelines, a set of workload processing chiplets can monitor the reservation table for available workloads. As provided herein, the initial raw sensor data can be referenced in the reservation table and processed through execution by an initial set of workloads by the workload processing chiplets. As an example, this initial processing can comprise stitching images to create a 360-degree sensor view of the vehicle's surrounding environment, which can enable the chiplets to perform additional workloads on the sensor view (e.g., object detection and classification tasks).

When workloads are completed by the chiplets, dependency information for additional workloads in the reservation table can be updated to indicate so, and the additional workloads can become available for execution in the reservation table when no dependencies exist. In certain examples, the chiplets can monitor the reservation table by way of a workload window and instruction pointer arrangement, in which each entry of the reservation table is sequentially analyzed along the workload window by the workload processing chiplets. If a particular workload is ready for execution (e.g., all dependencies are resolved), the workload processing chiplets can execute the workload accordingly.

As provided herein, the execution of the workloads can be governed by a compute graph of a software structure that determines when dependencies for particular workloads are satisfied and when those workloads can be executed accordingly. In accordance with examples described herein, the scheduling and allocation of workloads on the given set of hardware components can be optimized (e.g., to maximize data locality and minimize latency), and the scheduling program (e.g., on the central chiplet) can be configured based on the optimization. As further provided herein, a precomputed coherence protocol can be implemented by configuring coherence information (e.g., cache flags) in workload entries in the reservation table.

In certain implementations, the computing system can perform one or more functions described herein using a learning-based approach, such as by executing an artificial neural network (e.g., a recurrent neural network, convolutional neural network, etc.) or one or more machine-learning models. Such learning-based approaches can further correspond to the computing system storing or including one or more machine-learned models. In an embodiment, the machine-learned models may include an unsupervised learning model. In an embodiment, the machine-learned models may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

Furthermore, one or more embodiments described herein may be implemented on a computing system. Examples computing systems can include one or more control circuits that may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), systems on chip (SoCs), or any other control circuit. In some implementations, the control circuit(s) and/or computing system may be part of, or may form, a vehicle control unit (also referred to as a vehicle controller) that is embedded or otherwise disposed in a vehicle (e.g., a Mercedes-Benz® car, truck, or van). For example, the vehicle controller may be or may include an infotainment system controller (e.g., an infotainment head-unit), a telematics control unit (TCU), an electronic control unit (ECU), a central powertrain controller (CPC), a central exterior & interior controller (CEIC), a zone controller, an autonomous vehicle control system, or any other controller (the term "or" is used herein interchangeably with "and/or").

In an embodiment, the control circuit(s) may be programmed by one or more computer-readable or computer-executable instructions stored on the non-transitory computer-readable medium. The non-transitory computer-readable medium may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, for example, a computer diskette, a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick. In some cases, the non-transitory computer-readable medium may store computer-executable instructions or computer-readable instructions.

In various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit to perform one or more functional tasks. The modules and computer-readable/executable instructions may be described as performing various operations or tasks when the control circuit(s) or other hardware components execute the modules or computer-readable instructions.

In further embodiments, the computing system can include a communication interface that enables communications over one or more networks to transmit and receive data. In certain embodiments, the communication interface may be used to communicate with one or more other computing systems. The communication interface may include any circuits, components, software, etc. for communicating via one or more networks (e.g., a local area network, wide area network, the Internet, secure network, cellular network, mesh network, and/or peer-to-peer communication link). In some implementations, the communication interface may include for example, one or more of a communications controller, receiver, transceiver, transmitter, port, conductors, software and/or hardware for communicating data/information.

As provided herein, a "network" or "one or more networks" can comprise any type of network or combination of networks that allows for communication between devices. In an embodiment, the network may include one or more of a local area network, wide area network, the Internet, secure network, cellular network, mesh network, peer-to-peer communication link or some combination thereof and may include any number of wired or wireless links. Communication over the network(s) may be accomplished, for instance, via a network interface using any type of protocol, protection scheme, encoding, format, packaging, etc.

One or more examples described herein provide that methods, techniques, and actions performed by a computing device are performed programmatically, or as a computer implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers and/or personal computers using network equipment (e.g., routers). Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of non-transitory computer-readable mediums include permanent memory storage devices, such as hard drives on personal computers or servers. Other examples of computer storage mediums include portable storage units, such as flash memory or magnetic memory. Computers, terminals, network-enabled devices are all examples of machines and devices that utilize processors, memory, and instructions stored on computer-readable mediums. Additionally, examples may be implemented in the form of computer programs, or a computer usable carrier medium capable of carrying such a program.

Example Cache Hierarchy

FIG. 1 is a block diagram depicting a computing system 100 for precomputing and/or implementing a coherence protocol, in accordance with examples described herein. In certain examples, the computing system 100 can comprise a set of chiplets 110, 130 and a central chiplet 150 comprising a shared memory 155 (e.g., a main memory), with each chiplet 110, 130 having one or more processing cores 112, 122, 132 and being connected to each other via interconnects 162, 164 (e.g., UCIe standardized interconnects). In certain implementations, each processing core 112, 122, 132 of each chiplet 110, 130 can connect to at least one dedicated cache. In the example shown in FIG. 1, chiplet 110 includes a first processing core 112 and a second processing core 122, and chiplet 130 includes a single processing core 132.

In the example arrangement shown in FIG. 1, each chiplet 110, 130 includes a cache hierarchy for each processing core 112, 122, 132. For example, chiplet 110 includes a first processing core 112 and a second processing core 122, each of which connect to a level one cache 114, 124 and a level two cache 116, 126. Chiplet 130 includes a single processing core 132, which also connects to a level one cache 134 and a level two cache 136. The processing cores 112, 122 of chiplet 110 can further connect to a shared cache (e.g., a level three cache 120) within the chiplet 110. As shown in FIG. 1, each processing core 112, 122, 132 of each chiplet can further connect to a shared memory 155 of the central chiplet 150 via the hierarchy of caches.

According to examples described herein, the hierarchical cache arrangement shown in FIG. 1 necessitates a cache coherence protocol when chiplet 110 and chiplet 130 process the same data in the shared memory of the central chiplet 150. A given software compute graph can detail the interdependencies of all software tasks (also referred to herein as "workloads") and the hardware topology can define the various hardware components where the software tasks are to be scheduled and executed. In the context of FIG. 1, if a software task on processing core 112 in chiplet 110 operates on private memory that only that software task accesses, there is no need for the memory to be made coherent in the shared memory 155 if the task fits within the local caches (level one cache 114 and level two cache 116). If a software task on processing core 112 in chiplet 110 writes an output to processing core 122 in chiplet 110, there is still no need to require the memory to be made coherent in the shared memory 155 if the task fits within the level three cache 120.

However, if a software task on processing core 112 or processing core 122 reads and writes data between another software task on processing core 132 in chiplet 130, then the caches must be made coherent in the shared memory 155 of the central chiplet 150. Additionally, directional characteristics of memory usage may also be considered in precomputing the coherence protocol. For example, any read-only memory in a local cache need not be made coherent in the shared memory 155 of the central chiplet 150. As such, because the compute graph detailing the interdependencies of all software tasks is known, the distribution of data into the various caches and the shared memory is also known, and the execution of the software tasks on specified components of the hardware topology is also known, the computing system 100 can generate a precomputed coherence protocol to optimize memory read and write access within the software structure and hardware topology, as opposed to implementing a runtime analysis to dynamically determine coherency.

As provided herein, the precomputed coherence protocol can be implemented by a scheduling program in the central chiplet 150, as described in further detail below with respect to FIG. 4. For example, the scheduling program can manage a reservation table in the shared memory 155, which the chiplets 110, 130 can monitor for available workloads. The workload entries in the reservation table can indicate the particular software task (or workload) to be executed, any dependency information that needs to be satisfied prior to executing the software task, a memory address where the chiplet 110, 130 can access the data for executing the software task, and the like. In accordance with examples described herein, each workload entry can further include a cache flag or coherency flag (e.g., one or more bits) that identifies whether the data for the workload is temporal in nature (e.g., the data needs to be accessed and processed again) or non-temporal in nature (e.g., the data requires no further processing).

System Description

Figure 2:
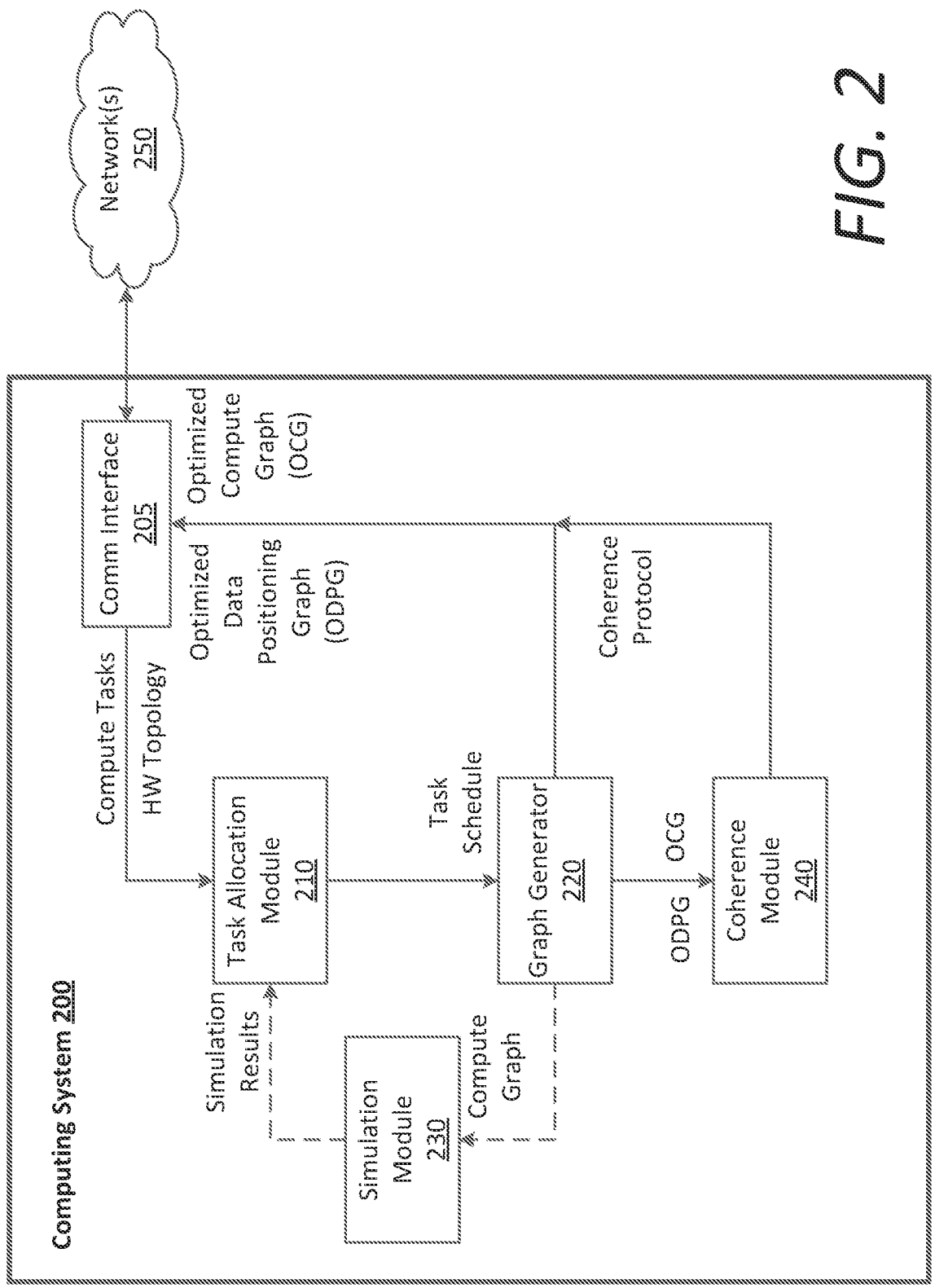
FIG. 2 is a block diagram depicting a computing system implementing specialized modules for optimizing compute tasks and generating a precomputed coherence protocol, according to examples described herein.

FIG. 2 is a block diagram depicting a computing system implementing specialized modules for optimizing compute tasks and generating a precomputed coherence protocol, according to examples described herein. As provided herein, the computing system 200 shown and described with respect to FIG. 2 may be implemented as a backend computing system, front-end computing system (e.g., the computing system 100 shown in FIG. 1, system-on-chip, and/or an on-board computing system of a vehicle), or a combination of a backend computing system and front-end computing system.

Referring to FIG. 2, the computing system 200 can include a communication interface 205 that enables the computing system 200 to communicate over one or more networks 250. For backend computing system embodiments, the communication interface 205 can receive a particular description of (i) a hardware topology comprising an arrangement of computer components (e.g., one or more SoCs), and (ii) a software structure comprising a set of compute tasks that correspond to workloads or runnables. In various examples described herein, the compute tasks can correspond to autonomous driving tasks.

As an example embodiment, the computing system 200 can be comprised in one or more backend computer servers (e.g., in a server farm or data center facility), and can perform the compute task allocation and optimization techniques described herein for one or more computing applications, such as for autonomous drive computing systems located on-board autonomous vehicles. These autonomous drive computing systems can comprise one or more SoCs that include a fixed hardware arrangement of chiplets, hierarchical caches, and interconnects that are defined by a particular specification (e.g., UCIe).

In another embodiment, the computing system 200 can be included in the SoC arrangement(s), in which the computing system 200 performs a self-optimization for compute tasks configured to be executed by the SoCs. In various examples, each SoC can include a set of chiplets, including a central chiplet 150 comprising a shared memory 155 in which a reservation table is utilized to execute various autonomous driving workloads as runnables in independent pipelines, as described herein.

The computing system 200 can include a task allocation module 210 that can generate an optimal task schedule using a learning-based approach or heuristically through optimization of a set of weighted parameters. For example, the hardware components of an SoC or multiple SoC arrangement and their interconnects can include limitations on a set of weighted parameters, such as maximum constraints for latency, bandwidth, memory, power usage, computing power, thermal cooling, security, robustness, etc. In further embodiments, one or more weighted parameters may be identified through learning-based simulation (described below), and can further include individual latency, compute unit, bandwidth, thermal values, etc. for individual components of the hardware topology (e.g., ML accelerators, autonomous drive chiplet, high-bandwidth memory chiplets, interconnects, etc.) For illustration, a network path for transmitting data between two or more cores in the SoC can pass through data and/or execution caches (level one caches), one or more level two caches associated with each core, a shared cache (level three cache), a set of network interface units (NIUs), and/or a set of UCIe interconnects. Each of these components and/or the connections between the components may have constraints on latency, bandwidth, memory size, computing power, and the like.

In various embodiments, the task allocation module 210 can utilize a heuristic technique (e.g., a traveling salesman algorithm) using weighted parameters of the hardware topology (e.g., latency, bandwidth, memory size, computing power, etc.) to determine a most optimal distribution of the software structure for execution on the individual hardware components of the hardware topology. As provided herein, the software structure can be arranged as a set of compute tasks in a compute graph comprising various workloads (nodes in the graph) that may be interconnected based on the necessary interactions between the runnables. For example, a first workload can involve the detection of external dynamic entities (e.g., pedestrians, other vehicles, bicyclists, etc.) within proximity of the vehicle. A second workload can involve predicting the motion of each external dynamic entity. Accordingly, the second workload receives, as input, the output of the first workload, and therefore these workloads include a connection within the initial compute graph.

As further provided herein, a compute graph can identify which particular hardware components are to execute each particular compute task of the software structure, and can be modified using a scheduling program and workload reservation table, as described in detail below in FIG. 4. Furthermore, in example described herein, the task allocation module 210 and graph generator 220 shown with respect to FIG. 2 can output an optimized compute graph as well as an optimized data positioning graph, which identifies the data location (e.g., in a specified memory, solid state drive, high-bandwidth memory, cache, mailbox, etc.) of where specific data elements are to be stored and accessed by specified hardware components. As such, the optimization of compute tasks performed by the task allocation module 210 and graph generator 220 given a hardware topology can result in an affinity schedule, in which specified compute tasks are allocated to specified processing units.

Execution of the heuristic method (e.g., the traveling salesman algorithm) by the task allocation module 210, given the weighted constraints of the hardware topology and the requirements of the various runnables and their connections in the compute graph, can result in a task schedule that can be processed by a graph generator 220 of the computing system 200 to generate an optimized data positioning graph and an optimized compute graph executable by the hardware components of the hardware topology. As provided herein, the optimized data positioning graph maximizes data locality for the hardware components in accessing the data required for executing their assigned runnables. In various examples, the optimized compute graph can provide a most optimal solution for (i) allocating workloads to specified hardware components, and (ii) scheduling the execution of the workloads on the specified hardware components. Especially, execution of a traveling salesman algorithm by the task allocation module 210 can facilitate in the graph generator 220 producing an optimized compute graph and optimized data positioning graph geared towards minimizing network latency, power consumption, and/or memory usage within the hardware topology.

Upon converging on the best-fit and most optimal solution, the task schedule and optimized compute graph outputs of the task allocation module 210 and graph generator 220 can be utilized to allocate and schedule the runnables. In the context of an SoC hardware arrangement, a mailbox and/or reservation table implemented on a central chiplet that includes a shared memory accessible by other workload processing chiplets, can allocate and schedule the workloads (e.g., in the reservation table) in accordance with the optimized compute graph, and position raw or processed data in accordance with the optimized data positioning graph.

In further examples, the computing system 200 can reevaluate the execution of the runnables in the optimized manner as outputted via the heuristic technique. For example, over time, certain computing components may experience wear or natural degradation. Additionally, over-the-air software updates can add or reduce software constraints, such as bandwidth requirements, memory usage, latency limits, etc. As such, the task allocation module 210 and graph generator 220 can reevaluate the compute tasks and the hardware topology to determine whether a more optimized solution exists. In certain implementations, the central chiplet can periodically or dynamically perform the heuristic optimization (e.g., given the wear and/or updated software requirements). If a more optimal solution is determined, the task allocation module 210 and graph generator 220 can generate updated task schedules and compute graphs respectively based on the updated information from the hardware topology and/or compute tasks.

In alternative embodiments, the task allocation module 210 and graph generator 220 can be implemented in a learning-based approach, such as a neural network utilizing machine learning (ML) trained to determine an optimal fit for compute tasks of a software structure on a given hardware topology (e.g., without weighted parameters, or to identify weighted parameters for the heuristic approach). In such embodiments, the computing system 200 can allocate compute tasks to specified hardware component(s) for execution, and ultimately configure an optimized data positioning graph and optimized schedule for executing the cumulative set of compute tasks on the hardware components. In such an approach, the task allocation module 210 and graph generator 220 can iteratively "distribute" the software structure (comprising the set of compute tasks) and position raw and processed data onto the hardware topology arbitrarily and determine a performance result of the distribution.

For each iteration, a simulation module 230 of the computing system 200 can simulate the distribution (e.g., simulate data distribution to caches and other memory components, and execution of the compute tasks on the hardware components as distributed), measure the results (e.g., bandwidth usage across hardware components, latency, memory usage, power consumption, etc.), and repeat the process any number of times. Upon completing any number of simulations, the computing system 200 can rank the distributions accordingly. It is contemplated that this ML approach may be used alone or in combination with other approaches described herein to identify weight parameters and/or ultimately achieve a most optimal fit for the software structure given the hardware topology. For example, the computing system 200 can utilize both the learning-based approach to simulate various random distributions of the software structure, and the heuristic approach to provide a most optimal compute graph and data positioning graph for the software structure.

In accordance with various examples, the computing system 200 can include a coherence module 240 that can utilize the optimized data positioning graph and the optimized compute graph to generate a coherence protocol. In certain implementations, the coherence protocol can be enforced by a scheduling program that writes workload entries into a reservation table, where each workload entry can include a cache flag or coherency flag (e.g., a one or two-bit tag) that identifies the temporal or non-temporal nature of the data and can further indicate spatial information for the data. As a result, any runtime coherence analysis that consumes computing resources is unnecessary.

Example System-on-Chip

Figure 3:
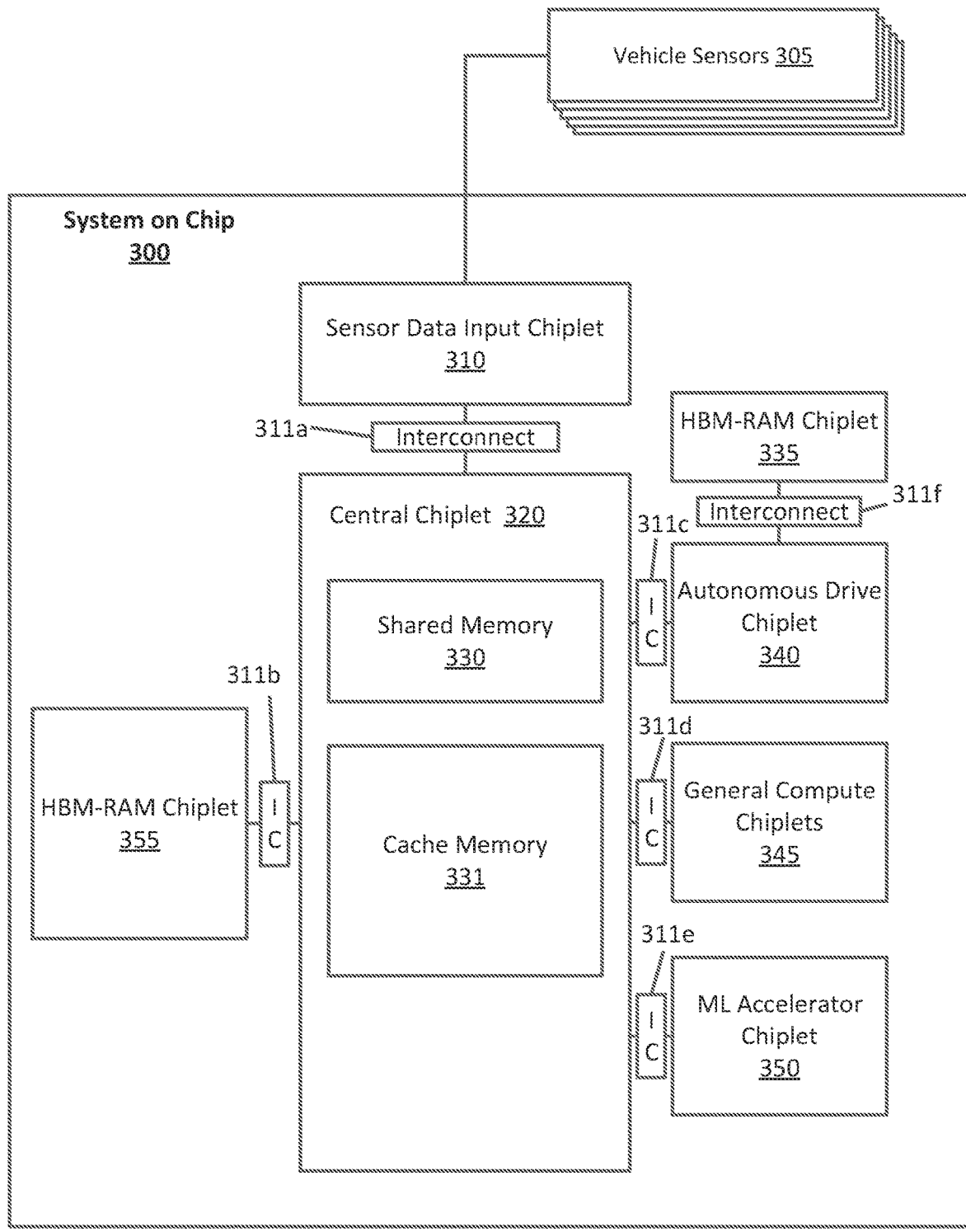
FIG. 3 is a block diagram depicting a system-on-chip (SoC) in which examples described herein may be implemented, in accordance with examples described herein.

FIG. 3 is a block diagram illustrating an example SoC 300, in accordance with examples described herein. The example SoC 300 shown in FIG. 3 can include additional components, and the components of system-on-chip 300 may be arranged in various alternative configurations other than the example shown. Thus, the system-on-chip 300 of FIG. 3 is described herein as an example arrangement for illustrative purposes and is not intended to limit the scope of the present disclosure in any manner. In certain implementations, the hardware components and arrangement shown in FIG. 3, can be comprised in a given hardware topology for compute task optimization, as described throughout the present disclosure.

Referring to FIG. 3, a sensor data input chiplet 310 of the system-on-chip 300 can receive sensor data from various vehicle sensors 305 of the vehicle. These vehicle sensors 305 can include any combination of image sensors (e.g., single cameras, binocular cameras, fisheye lens cameras, etc.), LIDAR sensors, radar sensors, ultrasonic sensors, proximity sensors, and the like. The sensor data input chiplet 310 can automatically dump the received sensor data as it's received into a cache memory 331 of the central chiplet 320. The sensor data input chiplet 310 can also include an image signal processor (ISP) responsible for capturing, processing, and enhancing images taken from the various vehicle sensors 305. The ISP takes the raw image data and performs a series of complex image processing operations, such as color, contrast, and brightness correction, noise reduction, and image enhancement, to create a higher-quality image that is ready for further processing or analysis by the other chiplets of the SoC 300. The ISP may also include features such as auto-focus, image stabilization, and advanced scene recognition to further enhance the quality of the captured images. The ISP can then store the higher-quality images in the cache memory 331.

In some aspects, the sensor data input chiplet 310 publishes identifying information for each item of sensor data (e.g., images, point cloud maps, etc.) to a shared memory 330 of a central chiplet 320, which acts as a central mailbox for synchronizing workloads for the various chiplets. The identifying information can include details such as an address in the cache memory 331 where the data is stored, the type of sensor data, which sensor captured the data, and a timestamp of when the data was captured.

To communicate with the central chiplet 320, the sensor data input chiplet 310 transmits data through an interconnect 311a. Interconnects 311a-f each represent die-to-die (D2D) interfaces between the chiplets of the SoC 300. In some aspects, the interconnects include a high-bandwidth data path used for general data purposes to the cache memory 331 and a high-reliability data path to transmit functional safety and scheduler information to the shared memory 330. Depending on bandwidth requirements, an interconnect may include more than one die-to-die interface. For example, interconnect 311a can include two interfaces to support higher bandwidth communications between the sensor data input chiplet 310 and the central chiplet 320.

In one aspect, the interconnects 311a-f implement the Universal Chiplet Interconnect Express (UCIe) standard and communicate through an indirect mode to allow each of the chiplet host processors to access remote memory as if it were local memory. This is achieved by using a specialized Network on Chip (NoC) Network Interface Unit (NIU) (allows freedom of interferences between devices connected to the network) that provides hardware-level support for remote direct memory access (RDMA) operations. In UCIe indirect mode, the host processor sends requests to the NIU, which then accesses the remote memory and returns the data to the host processor. This approach allows for efficient and low-latency access to remote memory, which can be particularly useful in distributed computing and data-intensive applications. Additionally, UCIe indirect mode provides a high degree of flexibility, as it can be used with a wide range of different network topologies and protocols.

In various examples, the system-on-chip 300 can include additional chiplets that can store, alter, or otherwise process the sensor data cached by the sensor data input chiplet 310. The system-on-chip 300 can include an autonomous drive chiplet 340 that can perform the perception, sensor fusion, trajectory prediction, and/or other autonomous driving algorithms of the autonomous vehicle. The autonomous drive chiplet 340 can be connected to a dedicated HBM-RAM chiplet 335 in which the autonomous drive chiplet 340 can publish all status information, variables, statistical information, and/or processed sensor data as processed by the autonomous drive chiplet 340.

In various examples, the system-on-chip 300 can further include a machine-learning (ML) accelerator chiplet 340 that is specialized for accelerating AI workloads, such as image inferences or other sensor inferences using machine learning, in order to achieve high performance and low power consumption for these workloads. The ML accelerator chiplet 340 can include an engine designed to efficiently process graph-based data structures, which are commonly used in AI workloads, and a highly parallel processor, allowing for efficient processing of large volumes of data. The ML accelerator chiplet 340 can also include specialized hardware accelerators for common AI operations such as matrix multiplication and convolution as well as a memory hierarchy designed to optimize memory access for AI workloads, which often have complex memory access patterns.

The general compute chiplets 345 can provide general purpose computing for the system-on-chip 300. For example, the general compute chiplets 345 can comprise high-powered central processing units and/or graphical processing units that can support the computing tasks of the central chiplet 320, autonomous drive chiplet 340, and/or the ML accelerator chiplet 350.

In various implementations, the shared memory 330 can store programs and instructions for performing autonomous driving tasks. The shared memory 330 of the central chiplet 320 can further include a reservation table that provides the various chiplets with the information needed (e.g., sensor data items and their locations in memory) for performing their individual tasks. Further description of the shared memory 330 in the context of the dual SoC arrangements described herein is provided below with respect to FIG. 4. The central chiplet 320 also includes the large cache memory 331, which supports invalidate and flush operations for stored data.

Cache miss and evictions from the cache memory 331 are sent by a high-bandwidth memory (HBM) RAM chiplet 355 connected to the central chiplet 320. The HBM-RAM chiplet 355 can include status information, variables, statistical information, and/or sensor data for all other chiplets. In certain examples, the information stored in the HBM-RAM chiplet 355 can be stored for a predetermined period of time (e.g., ten seconds) before deleting or otherwise flushing the data. For example, when a fault occurs on the autonomous vehicle, the information stored in the HBM-RAM chiplet 355 can include all information necessary to diagnose and resolve the fault. Cache memory 331 keeps fresh data available with low latency and less power required compared to accessing data from the HBM-RAM chiplet 355.

As provided herein, the shared memory 330 can house a mailbox architecture in which a reflex program comprising a suite of instructions is used to execute workloads by the central chiplet 320, general compute chiplets 345, and/or autonomous drive chiplet 340. In certain examples, the central chiplet 320 can further execute a functional safety (FuSa) program that operates to compare and verify output of respective pipelines to ensure consistency in the ML inference operations. In still further examples, the central chiplet 320 can execute a thermal management program to ensure that the various components of the SoC 300 operates within normal temperature ranges. Further description of the shared memory 330 in the context of out-of-order workload execution in independent deterministic pipelines is provided below with respect to FIG. 3.

In accordance with examples described herein, the shared memory 330 and the central chiplet 320 can correspond to the shared memory 155 and the central chiplet 150 as shown and described with respect to FIG. 1. In further examples, the chiplets 110, 130 of FIG. 1 can comprise any one or more of the autonomous drive chiplet 340, general compute chiplets 345, ML accelerator chiplet 350, and/or HBM-RAM chiplets 335, 355 as shown in FIG. 3. As provided herein, the various hardware components of the system-on-chip 300 can execute an optimized compute graph in accordance with an optimized data positioning graph as generated by the graph generator 220 described with respect to FIG. 2. Accordingly, one or more components of the system-on-chip 300 (e.g., the central chiplet 320) can precompute and preconfigure the coherence protocol given that the compute graph and data positioning graph are known, which can be implemented by a scheduling program as described below.
Optimized Compute Task Scheduling and Cache Coherence FIG. 4 is a block diagram illustrating an example central chiplet of an SoC arrangement for executing workloads in accordance with a precomputed coherence protocol, in accordance with examples described herein. The central chiplet 400 shown in FIG. 4 can correspond to the central chiplet 320 of the SoC 300 as shown in FIG. 3, or the central chiplet 150 as shown and described with respect to FIG. 1. Furthermore, in certain examples, the data input chiplet(s) 410 of FIG. 4 can correspond to the sensor data input chiplet 310 shown in FIG. 3, or can generally comprise one or more data input chiplets 410 for purposes other than sensor data processing.

For example, the data input chiplet(s) 410 can be implemented for any type of data processing in which workloads are executed by workload processing chiplets 420 or other multi-processing system arrangements that utilize a shared memory 460. As provided herein, a predetermined software structure (e.g., one more computer programs or models), optimized compute graph, and optimized data positioning graph in which software tasks are allocated to specified hardware components of a know hardware topology facilitates the ability to precompute and preconfigure a coherence protocol. This precomputed coherence protocol can be implemented by a scheduling program 442, which can further decode the software tasks (e.g., included in reflex program 430, application program 435, thermal management program 437, and/or functional safety (FuSa) program 438) into individual workloads. Each workload can comprise a software task of the predetermined software structure, and can be represented by a workload entry 452 in a reservation table 450 managed in a shared memory 460 of the central chiplet 400.

As provided herein, each workload entry 452 can include one or more of the following: a workload identifier that identifies the workload to be executed, a memory address corresponding to a location in memory (e.g., a specified cache) where data is to be processed, dependency information that must be satisfied prior to the workload being executed, and/or affinity information identifying which particular hardware component(s) are to execute the workload. In accordance with further examples, each workload entry 452 can further include a cache flag or coherency flag inputted by the scheduling program 442 that, collectively, enables implementation of the precomputed coherence protocol.

In autonomous drive implementations, the reflex program 430 can comprise a set of instructions for executing reflex workloads in workload pipelines. The reflex workloads can comprise sensor data acquisition, sensor fusion, and inference tasks that facilitate scene understanding of the surrounding environment of the vehicle. These tasks can comprise two-dimensional image processing, sensor fused data processing (e.g., three-dimensional LIDAR, radar, and image fusion data), neural radiance field (NeRF) scene reconstruction, occupancy grid determination, object detection and classification, motion prediction, and other scene understanding tasks for autonomous vehicle operation.

In such implementations, the application program 435 can comprise a set of instructions for operating the vehicle controls of the autonomous vehicle based on the output of the reflex workload pipelines. For example, the application program 435 can be executed by one or more processors 440 of the central chiplet 400 and/or one or more of the workload processing chiplets 420 (e.g., the autonomous drive chiplet 340 of FIG. 3) to dynamically generate a motion plan for the vehicle based on the execution of the reflex workloads, and operate the vehicle's controls (e.g., acceleration, braking, steering, and signaling systems) to execute the motion plan accordingly.

In various implementations, the central chiplet 400 can include a set of one or more processors 440 (e.g., a transient-resistant CPU and general compute CPUs) that can execute the scheduling program 442 to schedule the workloads in respective workload pipelines (e.g., in accordance with the compute task and data positioning optimizations described herein). In certain examples, one or more of the processors 440 can execute reflex workloads in accordance with the reflex program 430 and/or application workloads in accordance with the application program 435. As such, the processors 440 of the central chiplet 400 can reference, monitor, and update dependency information in workload entries of the reservation table 450 as workloads become available and are executed accordingly. For example, when a workload is executed by a particular chiplet, the chiplet updates the dependency information of other workloads in the reservation table 450 to indicate that the workload has been completed. This can include changing a bitwise operator or binary value representing the workload (e.g., from 0 to 1) to indicate in the reservation table 450 that the workload has been completed. Accordingly, the dependency information for all workloads having dependency on the completed workload is updated accordingly.

In embodiments described herein, the scheduling program 442 and reservation table 450 can be configured based on the compute task and data positioning optimizations performed by the task allocation module 210 and graph generator 220 as shown and described with respect to FIG. 2. For example, based on the optimized compute graph and optimized data positioning graph-indicating where raw and processed sensor data is to be positioned and accessed, as well as which computer components are to execute the individual workloads when available (e.g., individual workload processing chiplets 420 and/or processors 440 of the central chiplet 400)—the scheduling program 442 can schedule the workload IDs in the reservation table 450 for execution by configuring the dependency information, address information (e.g., cache or memory location of where to access sensor data for executing the runnable), and affinity information (e.g., the specific processing component to execute the runnable).

According to examples described herein, the reservation table 450 can include workload entries 452, each of which indicates a workload identifier that describes the workload to be performed, an address in the cache memory 415 and/or HBM-RAM of the location of raw or processed sensor data required for executing the workload, any dependency information corresponding to dependencies that need to be resolved prior to executing the workload, and/or affinity information specifying which hardware component is to execute the runnable when the workload is available (e.g., when all dependencies are met). In certain aspects, the dependencies can correspond to other workloads that need to be executed. Once the dependencies for a particular workload are resolved, the workload entry can be updated (e.g., by the chiplet executing the dependent workloads, or by the processors 440 of the central chiplet 400 through execution of the scheduling program 442). When no dependencies exist for a particular workload as referenced in the reservation table 450, the workload can be executed in a respective pipeline by a corresponding workload processing chiplet 420.

Figure 4:
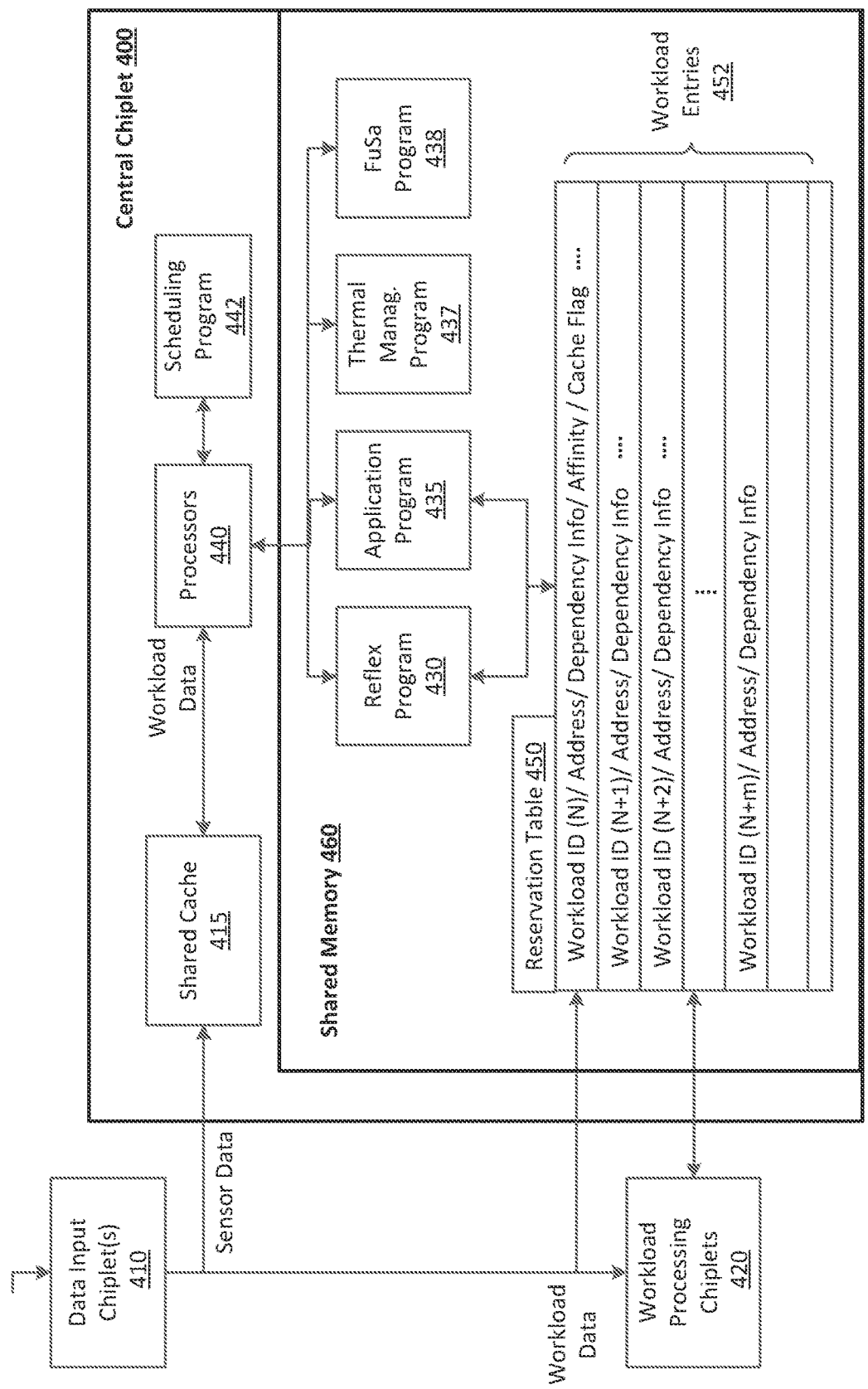
FIG. 4 is a block diagram illustrating an example central chiplet of an SoC arrangement for executing workloads in accordance with a precomputed coherence protocol, in accordance with examples described herein.

In various implementations, the data input chiplet 410 can obtain sensor data from the sensor system of the vehicle, and can store the sensor data (e.g., image data, LIDAR data, radar data, ultrasonic data, etc.) in a shared cache 415 of the central chiplet 400, as shown in FIG. 4, which can be accessed by any of the workload processing chiplets 420 for local storage and processing in a cache hierarchy of each of the workload processing chiplets 420, as shown in FIG. 1. The data input chiplet 410 can generate workload entries for the reservation table 450 comprising workload identifiers for the data (e.g., an identifier for each obtained image from various cameras of the vehicle's sensor system) and provide an address for each data item in the cache memory 415. In an autonomous vehicle example, an initial set of workloads can be executed on the raw sensor data by the processors 440 of the central chiplet 400 and/or workload processing chiplets 420, which can update the reservation table 450 to indicate that the initial set of workloads have been completed.

As described herein, the workload processing chiplets 420 can monitor the reservation table 450 to determine whether particular workloads in their respective pipelines are ready for execution (e.g., as dictated by the optimized compute graph). As an example, the workload processing chiplets 420 can continuously monitor the reservation table using a workload window (e.g., an instruction window for multimedia data) in which a pointer can sequentially read through each workload entry to determine whether the workloads have any unresolved dependencies. If one or more dependencies still exist in the workload entry, the pointer progresses to the next entry without the workload being executed. However, if the workload indicates that all dependencies have been resolved (e.g., all workloads upon which the particular workload depends have been executed), then the relevant workload processing chiplet 420 and/or processors 440 of the central chiplet 300 can execute the workload accordingly.

As such, the workloads are executed in an out-of-order manner where certain workloads are buffered until their dependencies are resolved. Accordingly, to facilitate out-oforder execution of workloads, the reservation table 450 comprises an out-of-order buffer that enables the workload processing chiplets 420 to execute the workloads in an order governed by the resolution of their dependencies in a deterministic manner. It is contemplated that out-of-order execution of workloads in the manner described herein can increase speed, increase power efficiency, and decrease complexity in the overall execution of the workloads.

As described herein, the workload processing chiplets 420 can execute workloads in each pipeline in a deterministic manner, such that successive workloads of the pipeline are dependent on the output of preceding workloads in the pipeline. In various implementations, the processors 440 and workload processing chiplets 420 can execute multiple independent workload pipelines in parallel, with each workload pipeline including a plurality of workloads to be executed in a deterministic manner. Each workload pipeline can provide sequential output (e.g., for other workload pipelines or for processing by the application program 435 for autonomously operating the vehicle). Through concurrent execution of the reflex workloads in deterministic pipelines, the application program 435 can autonomously operate the controls of the vehicle along a travel route.

As an illustration, the scheduling program 442 can cause the processors 440 and workload processing chiplets 420 to execute the workloads in independent workload pipelines. In previous implementations, each image generated by the camera system of the vehicle would be processed or inferred on as the image becomes available. Instruction sets included in the reflex program 430 would involve acquiring the image, scheduling inference on the image by a workload processing chiplet, performing inference on the image, acquiring a second image, scheduling inference on the second image by the workload processing chiplet, and performing inference on the second image, and so on across the suite of cameras of the vehicle. By reorganizing the order in which workloads are processed, the complexity of computation is significantly reduced. Specifically, for validating an autonomous driving system that utilizes out-of-order workload execution as described herein, the number of computational combinations for verification (e.g., by a safety authority) is significantly reduced.

As provided herein, the use of the workload window and reservation table 450 referencing dependency information for workloads enables the workload processing chiplets 420 to operate more efficiently by performing out-of-order execution on the workloads. Instead of performing inference on images based on when they are available, a workload processing chiplet 420 can acquire all images from all cameras first, and then perform inference on all the images together. Accordingly, the workload processing chiplet 420 executes its workloads with significantly reduced complexity, increased speed, and reduced power requirements.

In further examples, the shared memory 460 can include a thermal management program 437 executable by the one or more processors 440 to manage the various temperatures of the SoC 200, operate cooling components, perform hardware throttling, switch to backup components (e.g., a backup SoC), and the like. In still further examples, the shared memory 460 can include a FuSa program 438 that performs functional safety tasks for the SoC 200, such as monitoring communications within the SoC (e.g., using error correction code), comparing output of different pipelines, and monitoring hardware performance of the SoC. According to examples described herein, the thermal management program 437 and FuSa program 438 can perform their respective tasks in independent pipelines.

As described herein, the cache flag or coherency flag in each workload entry 452 can direct or indicate the load and store configuration of the data upon which the workload is to be executed. In one example, the cache flag or coherency flag comprises a single bit that indicates whether the data is temporal (e.g., needs to be used for execution of another workload), or non-temporal (e.g., the data will not be needed for any other workloads). Accordingly, the cache or coherency flag in each workload entry 452 can indicate whether the data corresponding to the workload entry 452 is to be processed and stored in a local cache of the particular workload processing chiplet 420 executing the workload, or whether the data is to be processed and stored in the shared cache 415 of the central chiplet 400. In further examples, the cache flag or coherency flag can identify a spatial aspect of the data, such as whether to store the data in an HBM-RAM chiplet, the shared cache 415 or main memory, or in a local cache in the cache hierarchy of a particular chiplet, as shown in FIG. 1. In such examples, the cache flag or coherency flag can comprise a single or multiple bits in, for example, a 64-bit, 128-bit, 256-bit, etc. workload entry 452.

Methodology

Figure 5:
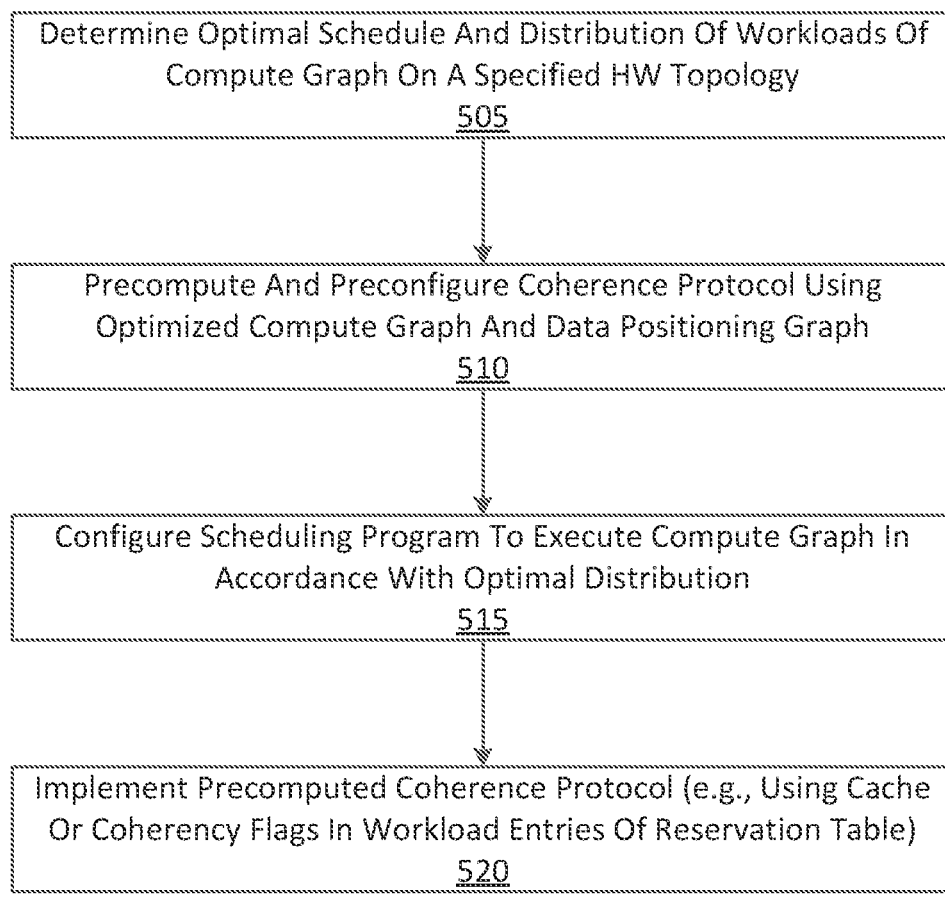
FIG. 5 is a flow chart describing an example method of precomputing and implementing a coherence protocol, in accordance with examples described herein.

FIG. 5 is a flow chart describing an example method of precomputing and implementing a coherence protocol, in accordance with examples described herein. In the below description of FIG. 5, reference may be made to reference characters representing various features as shown and described with respect to FIGS. 1 through 4. Furthermore, the method described in connection with FIG. 5 may be performed by a specified computing device that executes the optimized compute tasks of the software structure and implements the precomputed coherence protocol, as described with examples herein.

Referring to FIG. 5, at block 505, a computing system can determine an optimal schedule and distribution of workloads included in a compute graph on a specified hardware topology. In certain implementations, the workloads of the compute graph can be allocated to specific processing cores and the data on which the workloads are to be executed can also be allocated to specific memory components, which can include local caches of specified chiplets in a cache hierarchy as shown in FIG. 1, a main memory or shared memory 155, 330, 460 as shown in FIGS. 1, 3, and 4, a shared cache 331, 415 as shown in FIGS. 3 and 4, and/or an HBM-RAM chiplet 335, 355 as shown in FIG. 3. Furthermore, the optimal schedule and distribution of workloads can correspond to the optimize compute graph and optimized data positioning graph as generated by the computing system 200 as shown and described with respect to FIG. 2.

At block 510, given the known schedule and distribution of workloads on the hardware topology (e.g., as determined by the optimized compute graph and data positioning graph), the computing system can precompute and preconfigure a coherence protocol. At block 515, the computing system can configure a scheduling program 442 to execute the optimized compute graph in accordance with the optimal distribution of workloads. As provided herein, the scheduling program 442 can do so through the configuration of workload entries 452 in the reservation table 450 of a shared memory 460 that is monitored by one or more processors 440 of the central chiplet 400 and/or the workload processing chiplets 420 of the computing system.

At block 520, the scheduling program 442 can further implement the precomputed coherence protocol (e.g., using cache flags or coherency flags in workload entries 452 of the reservation table 450). As described herein, the cache or coherency flag in each workload entry 452 can indicate whether the data corresponding to the workload entry 452 is to be processed and stored in a local cache of the particular workload processing chiplet 420 executing the workload, or whether the data is to be processed and stored in the shared cache 415 of the central chiplet 400. In certain implementations, the cache flag or coherency flag can further identify additional aspects of the data, such as a location in which processing core is to store the data after executing a workload. For example, the cache flag or coherency flag can indicate to a particular workload processing chiplet 420 whether to store the data in an HBM-RAM chiplet, the shared cache 415 or main memory, or in a local cache in the cache hierarchy of a particular chiplet.

It is contemplated that the implementation of a precomputed coherence protocol—given the known allocations of workloads in a compute graph and data positioning—can increase the computing performance of the computing system, since computing resources that would otherwise be used for runtime coherence prediction and/or determination can be implemented for purpose-based data processing. In the example of autonomous vehicles, the computing environment is space-restricted, so the elimination of runtime coherence processing can significantly increase sensor data processing, scene understanding, inference, and autonomous vehicle control capabilities. However, the examples described herein are not limited to sensor data processing in autonomous vehicle environments, but rather can be implemented in any computing environment where software task allocation on a specified hardware topology is known prior to execution.

It is further contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature.

What is claimed is:

1. A system-on-chip comprising:
   one or more workload processing chiplets; and
   a central chiplet comprising:
   a shared memory storing a reservation table comprising one or more workload entries, accessible by the one or more workload processing chiplets,
   wherein each workload entry of the one or more workload entries in the reservation table includes a workload identifier, a cache address, dependency information, and a cache flag; and
   a scheduling program to schedule execution of a set of workloads by the one or more workload processing chiplets in accordance with an optimized compute graph, an optimized data positioning graph, and a coherence protocol that is precomputed based on the optimized compute graph and the optimized data positioning graph,
   wherein the scheduling program schedules the set of workloads in accordance with the optimized compute graph and the optimized data positioning graph by configuring the one or more workload entries corresponding to the set of workloads in the reservation table.

2. The system-on-chip of claim 1, wherein the system-on-chip precomputes the coherence protocol using the optimized compute graph and the optimized data positioning graph.

3. The system-on-chip of claim 1, wherein the dependency information for a particular workload entry indicates one or more workloads that must be completed prior to a workload corresponding to the particular workload entry being completed.

4. The system-on-chip of claim 1, wherein each of the one or more workload processing chiplets includes one or more processing cores with each processing core having at least one dedicated cache.

5. The system-on-chip of claim 1, wherein the central chiplet further includes a main memory accessible by one or more data input chiplets for write operations and the one or more workload processing chiplets for read and write operations.

6. The system-on-chip of claim 5, wherein implementing the precomputed coherence protocol using cache flags in the reservation table results in optimized memory performance in the system-on-chip.

7. The system-on-chip of claim 1, wherein the precomputed coherence protocol eliminates a need for coherence protocol determination or prediction at runtime.

8. A multi-processor computing system comprising:
   one or more workload processors; and
   a shared memory storing (i) a reservation table comprising one or more workload entries, that is accessible by the one or more workload processors, wherein each workload entry of the one or more workload entries in the reservation table includes a workload identifier, a cache address, dependency information, and a cache flag, and (ii) a scheduling program to schedule execution of a set of workloads by the one or more workload processors in accordance with an optimized compute graph, an optimized data positioning graph, and a coherence protocol that is precomputed based on the optimized compute graph and the optimized data positioning graph, wherein the scheduling program schedules the set of workloads in accordance with the optimized compute graph and the optimized data positioning graph by configuring the one or more workload entries corresponding to the set of workloads in the reservation table.

9. The multi-processor computing system of claim 8, wherein the multi-processor computing system precomputes the coherence protocol using the optimized compute graph and the optimized data positioning graph.

10. The multi-processor computing system of claim 8, wherein the dependency information for a particular workload entry indicates one or more workloads that must be completed prior to a workload corresponding to the particular workload entry being completed.

11. The multi-processor computing system of claim 8, wherein each of the one or more workload processors includes one or more processing cores with each processing core having at least one dedicated cache.

12. The multi-processor computing system of claim 8, further comprising:
   a main memory accessible by one or more data input chiplets for write operations and the one or more workload processors for read and write operations.

13. The multi-processor computing system of claim 12, wherein implementing the precomputed coherence protocol using cache flags in the reservation table results in optimized memory performance in the main memory.

14. The multi-processor computing system of claim 8, wherein the precomputed coherence protocol eliminates a need for coherence protocol determination or prediction at runtime.

15. A computer-implemented method of preconfiguring a coherence protocol for a multi-processor computing system, the method being performed by one or more workload processors and comprising:

storing, in a shared memory, (i) a reservation table comprising one or more workload entries, that is accessible by the one or more workload processors, wherein each workload entry of the one or more workload entries in the reservation table includes a workload identifier, a cache address, dependency information, and a cache flag, and (ii) a scheduling program; and executing the scheduling program to schedule execution of a set of workloads by the one or more workload processors in accordance with an optimized compute graph, an optimized data positioning graph, and a coherence protocol that is precomputed based on the optimized compute graph and the optimized data positioning graph, wherein the scheduling program schedules the set of workloads in accordance with the optimized compute graph and the optimized data positioning graph by configuring the one or more workload entries corresponding to the set of workloads in the reservation table.

16. The method of claim 15, wherein the one or more processors precompute the coherence protocol using the optimized compute graph and the optimized data positioning graph.

* * * * *